(12) United States Patent
Oliver

(10) Patent No.: US 6,362,465 B1
(45) Date of Patent: Mar. 26, 2002

(54) OPTICAL SCANNING SYSTEM AND METHOD CAPABLE OF RECEIVING INPUTS FROM A USER

(75) Inventor: Thomas C Oliver, Windsor, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/332,308

(22) Filed: Jun. 14, 1999

(51) Int. Cl.⁷ .......................... H01L 27/00; H04N 1/024
(52) U.S. Cl. ...................... 250/208.1; 358/473; 358/474
(58) Field of Search .............................. 250/208.1, 234, 250/235; 358/473, 474; 345/169; 235/454, 472.01, 462.01, 470

(56) References Cited

U.S. PATENT DOCUMENTS

| 5,686,720 A | 11/1997 | Tullis ..................... 250/208.1 |
| 5,703,353 A | 12/1997 | Blalock et al. ......... 250/214 C |
| 5,769,384 A | 6/1998 | Baumgartner et al. .. 250/214 A |
| 5,825,044 A | 10/1998 | Allen et al. ................. 250/557 |
| 6,104,845 A | * 8/2000 | Lipman et al. ............. 358/473 |

* cited by examiner

Primary Examiner—F. L. Evans
Assistant Examiner—Zandra V. Smith

(57) ABSTRACT

An optical scanning device includes an imaging sensor that receives light and defines digital data based on the received light. A data manager stores this digital data into a storage device associated with the optical scanning device. The imaging sensor is coupled to a housing unit, which is also detachably coupled to a member that has a surface exposed to the imaging sensor. A movable device is disposed between the imaging sensor and the surface of the member, and a user moves the movable device into a position that corresponds with a particular character. Then, the imaging sensor produces a set of digital data defining an image of the movable device. An image analyzer analyzes the set of digital data and identifies a character based on a position of the movable device within the image.

17 Claims, 8 Drawing Sheets

OPTICAL SCANNING SYSTEM AND METHOD CAPABLE OF RECEIVING INPUTS FROM A USER

BACKGROUND OF THE INVENTION

1. Field of the Invention

The present invention generally relates to optical scanning systems and, in particular, to an optical scanning system (and method) that receives inputs from a user by scanning a movable device, determining a position of the movable device, and correlating the position of the movable device with a particular character.

2. Related Art

An optical scanner is a well-known device that scans a surface of a document and produces digital data defining an image of the scanned surface. Although optical scanners of various sizes exist in the art, it is often desirable to minimize the size of the optical scanner to increase the scanner's portability. In fact, some optical scanners are small, hand-held devices that can be easily transported to scan documents at various locations and events. Such an optical scanner is described in U.S. Pat. No. 5,825,044, entitled "Freehand Image Scanning Device which Compensates for Non-Linear Color Movement" and filed on Feb. 25, 1997, by Allen et al., which is incorporated herein by reference.

Furthermore, in many applications, it may be desirable to input text, such as alphanumeric or other types of characters, into an optical scanner. For example, it may desirable to annotate a scanned image by entering textual data into the optical scanner and correlating the textual data with the scanned image. Alternatively, it may be desirable to transmit data from an optical scanner via an e-mail and/or a facsimile message. Therefore, an e-mail address and/or a telephone number may need to be entered into the optical scanner. There are numerous other applications in which it may be desirable to input text into an optical scanner.

To allow a user to input text into an optical scanner, the optical scanner may be equipped with a keypad. However, a keypad usually increases the size and cost of the scanner, especially when the keypad includes a sufficient number of keys or buttons for inputting alphabetical characters. Therefore, in some applications, a keypad may not be suitable for entering text into an optical scanner, particularly when the scanner is a portable, hand-held device of a relatively small size.

Some optical scanners include a liquid crystal display (LCD) to interface data with a user. This LCD may be used to display a simulated keypad. In other words, the LCD may display various characters, and the user may scroll through the displayed characters and incrementally select each of the characters needed to form a word or words to be entered into the scanner. However, the foregoing process is relatively slow and tedious. Furthermore, as the size of optical scanners is reduced, it becomes increasingly difficult to adequately display the characters on the LCD. Therefore, utilization of a simulated keypad display on an LCD of an optical scanner may be undesirable in many applications.

Thus, a heretofore unaddressed need exists in the industry for a system enabling a user to efficiently input text into an optical scanner, particularly when the optical scanner is of a relatively small size.

SUMMARY OF THE INVENTION

The present invention overcomes the inadequacies and deficiencies of the prior art as discussed hereinbefore. Generally, the present invention provides an optical scanning system that enables a user to input characters into the system by sliding a movable device to different positions and activating a scan of the movable device at the different positions.

In architecture, the optical scanning system of the present invention includes an imaging sensor that receives light and defines digital data based on the received light. A data manager stores this digital data into a storage device. The imaging sensor is coupled to a housing unit, which is also detachably coupled to a member that has a surface exposed to the imaging sensor. A movable device is disposed between the imaging sensor and the surface of the member. A user moves the movable device into a position that corresponds with a particular character. Then, the imaging sensor produces a set of digital data defining an image of the movable device. An image analyzer analyzes the set of digital data and identifies a character based on a position of the movable device within the image.

The present invention can also be viewed as providing an optical scanning method for receiving inputs from a user. The method can be broadly conceptualized by the following steps: providing a scanning device, the scanning device having an imaging sensor; receiving an image of a document via the imaging sensor; defining the image in data; positioning an indicator such that the indicator is visible to the imaging sensor; receiving an image of the indicator via the imaging sensor; defining the image of the indicator in data; analyzing the data of the image of the indicator; determining a position of the indicator based on the analyzing step; and identifying a character based on the determining step.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

Figure 1A:
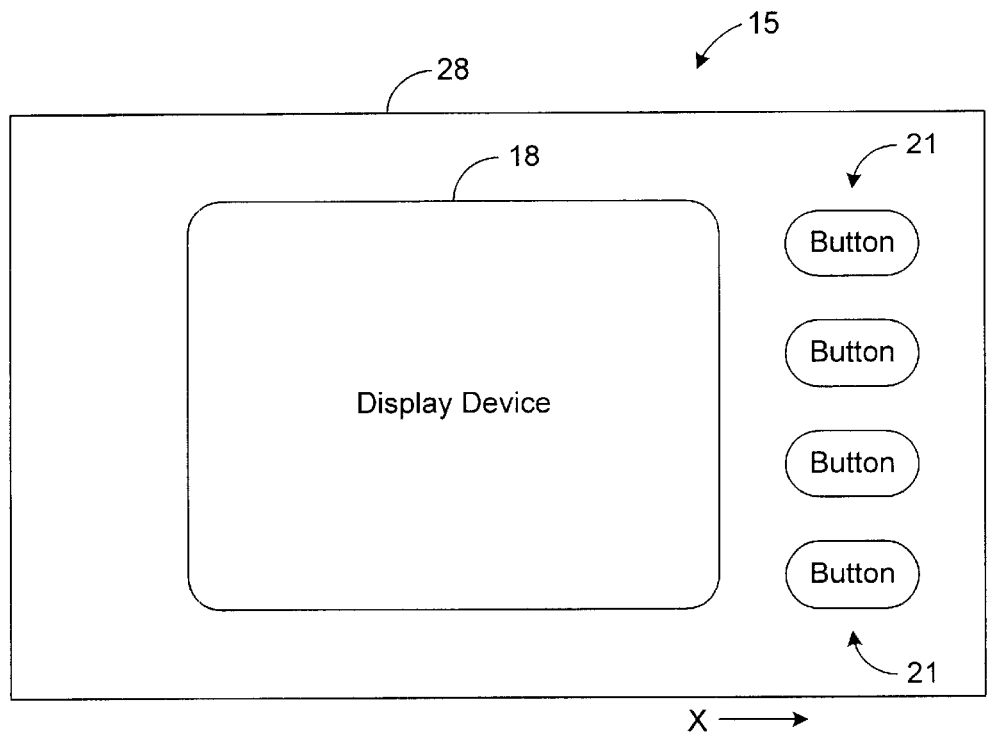
FIG. 1A is a diagram illustrating a front view of an optical scanning device in accordance with the present invention.
Figure 1B:
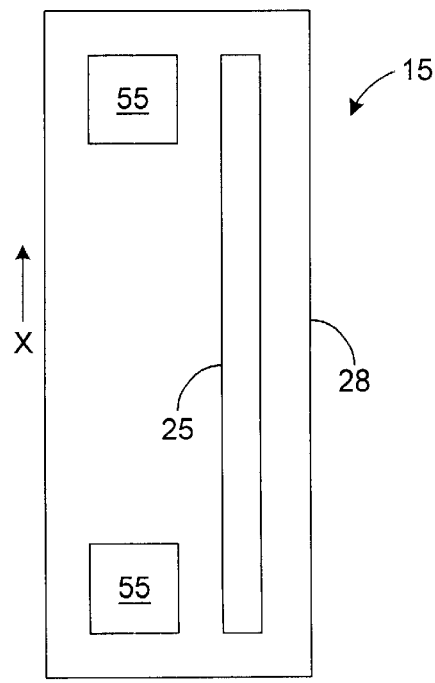
FIG. 1B is a diagram illustrating a bottom view of the optical scanning device depicted in FIG. 1A.

FIGS. 1A and 1B depict an exemplary design of a small, hand-held scanning device 15 that may be used to implement the present invention. As shown by FIG. 1A, the optical scanning device 15 may include a display device 18, such as a liquid crystal display (LCD), for displaying information to a user and buttons 21 or other types of switches for receiving inputs from the user. The scanning device 15 may also include an imaging sensor 25, as shown by FIG. 1B, that is utilized to capture images and, in particular, to scan the text of documents. As used herein, the word "scan" shall be defined as positioning a light-sensitive device adjacent to an image bearing surface, such as a document, converting the light and dark areas on the surface to binary digits that can be interpreted by a computer system. U.S. Pat. No. 5,825,044 describes, in detail, the process of capturing an image of a document via image sensor 25 and of producing digital data defining the captured image.

Figure 2:
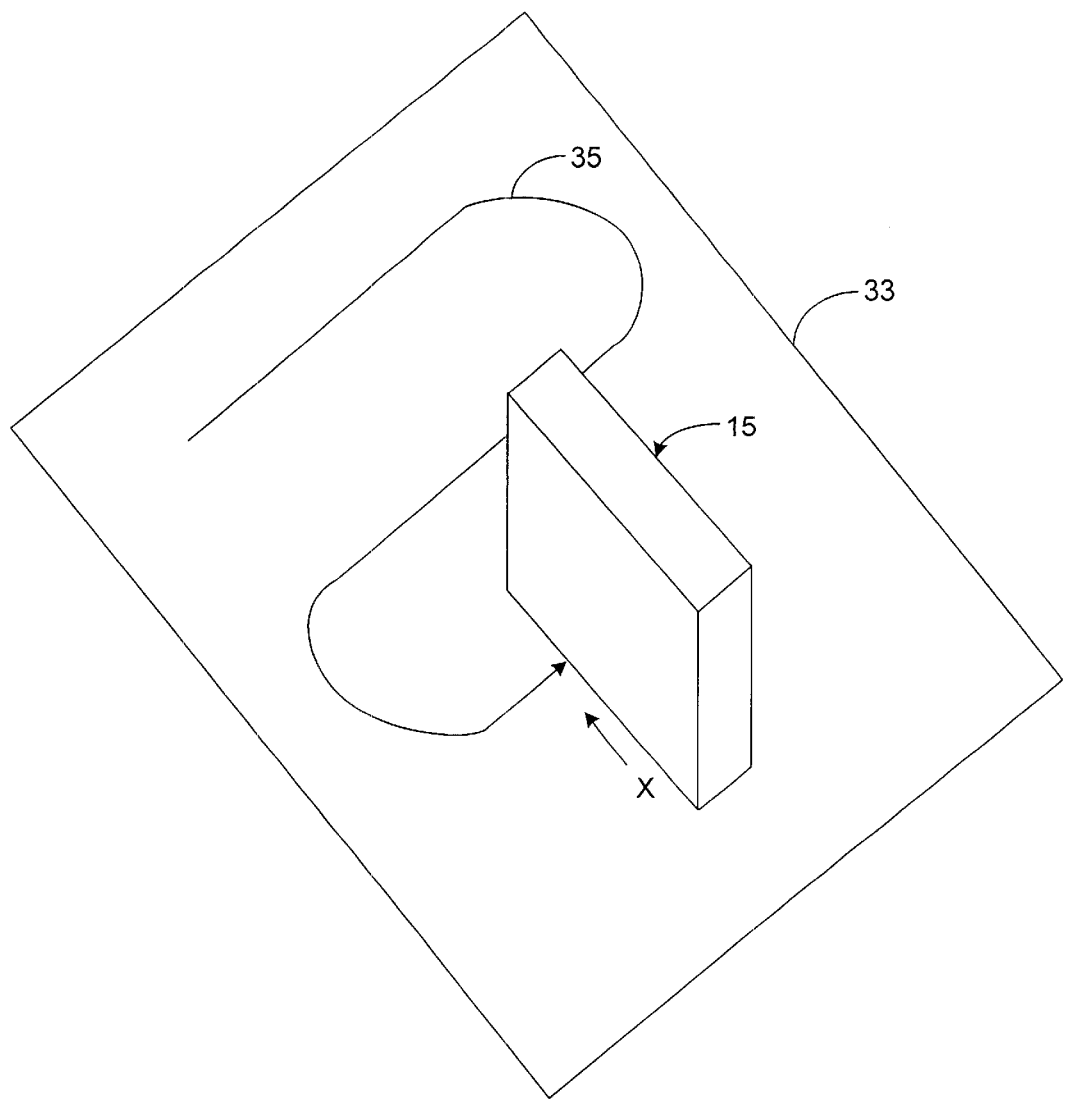
FIG. 2 is a diagram illustrating the optical scanning device of FIG. 1A during a document scan.

In the preferred embodiment, the imaging sensor 25 is preferably located on the bottom of a housing unit 28 as depicted by FIGS. 1A and 1B, although other locations for the imaging sensor 25 are possible. As shown by FIG. 2, the scanning device 15 is swiped across the surface of a textual document 33 in a meandering path 35 while the imaging sensor 25 is in close proximity to or in contact with the document 33. The imaging sensor 25 (FIG. 1B) faces the document 33 and is designed to receive light reflected off of the document 33 while the scanning device 15 (and, therefore, the imaging sensor 25) is being swiped across the surface of document 33.

The imaging sensor 25 is configured to convert the light received by the sensor 25 into digital data as the scanning device 15 is passing across the surface of the document 33. U.S. Pat. No. 5,686,720 entitled "Method and Device for Achieving High Contrast Surface Illumination," which is incorporated herein by reference, describes a method and device that may be used to illuminate and acquire data from the surface of the document 33. Furthermore, U.S. Pat. No. 5,769,384, entitled "Low Differential Light Level Photoreceptors," and U.S. Pat. No. 5,703,353, entitled "Offset Removal and Spatial Frequency Band Filtering Circuitry for Photoreceiver Signals," which are both incorporated herein by reference, describe methods for improving the accuracy of the data acquired by the scanning device 15.

Figure 3:
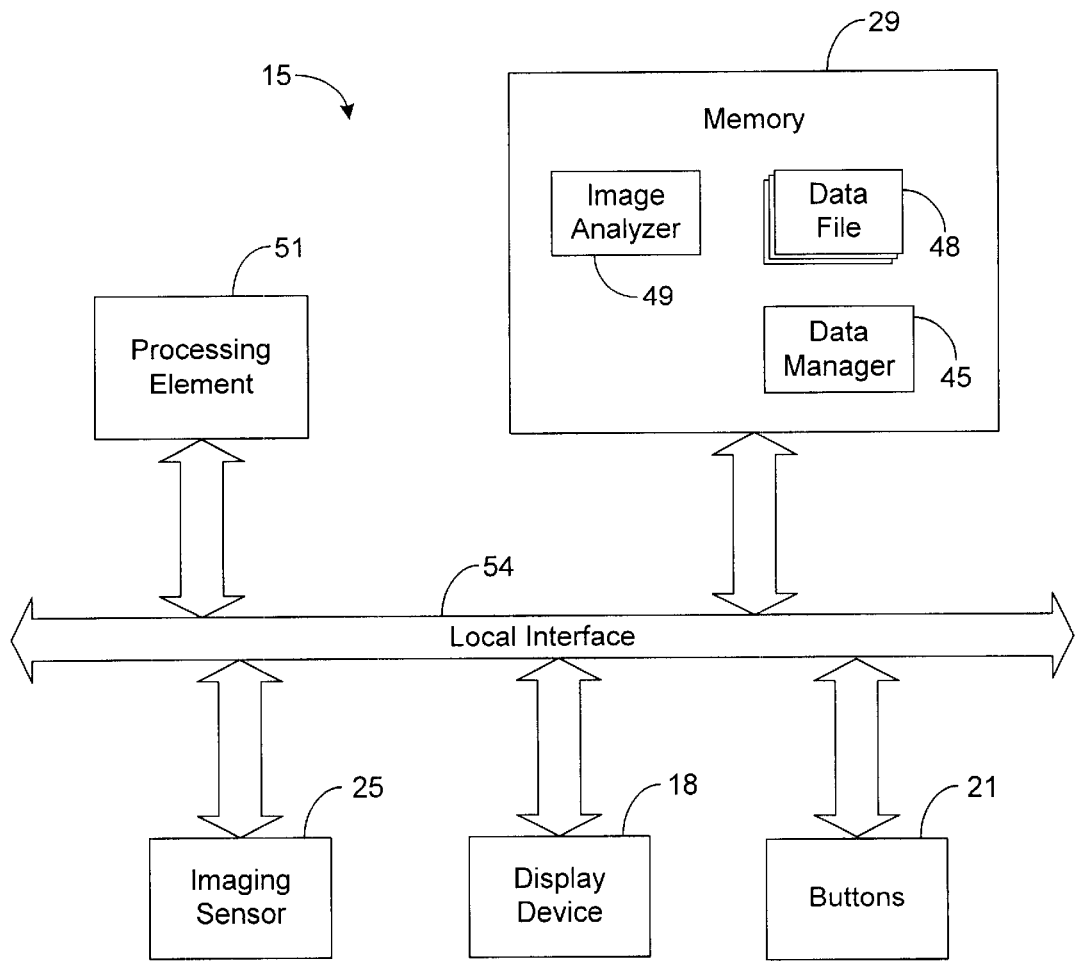
FIG. 3 is a block diagram illustrating the architecture of the optical scanning device of FIG. 1A.

As shown by FIG. 3, the scanning device 15 preferably includes a data manager 45, which is configured to receive the digital data produced by the imaging sensor 25 and to define an image of the document 33 in data. This data is then stored in memory 29 by the data manager 45 as a data file 48.

Note that the data manager 45 and/or an image analyzer 49, which will be described in further detail hereinbelow, may be implemented in software, hardware, or a combination thereof. In the preferred embodiment, as illustrated by way of example in FIG. 3, the data manager 45 and/or image analyzer 49 of the present invention along with their associated methodology are implemented in software and stored in memory 29. When implemented in software, the data manager 45 and/or image analyzer 49 can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the data manger 45 and/or image analyzer 49 may be magnetically stored and transported on a conventional portable computer diskette. To communicate to and drive the data manager 45, image analyzer 49 and/or the other elements of the scanning device 15, a processing element 51, such as a digital signal processor (DSP), may be interfaced with the other elements of the scanning device 15 via a local interface 54, which can include one or more buses.

Referring again to FIG. 2, it may take one or more swaths (i.e., side-to-side passes across the document 33) to acquire the data pertaining to the desired text of the document 33. As an example, the meandering path 35 in FIG. 2 is shown as having two and a fraction swaths. The swaths should include regions of overlap, so that a stitching process may be used by the data manager 45 to produce an accurate representation of the text of the document 33. At least one navigational sensor 55 may be included in the device 15, as shown by FIG. 1B, to aid in the stitching process by tracking the device 15 (and, therefore, the imaging sensor 25) as the device 15 moves across the surface of the document 33. U.S. Pat. No. 5,729,008, entitled "Method and Device for Tracking Relative Movement by Correlating Signals from an Array of Photoelements," which is incorporated herein by reference, describes a suitable method and device for tracking the device 15 to aid in the stitching process.

Figure 4A:
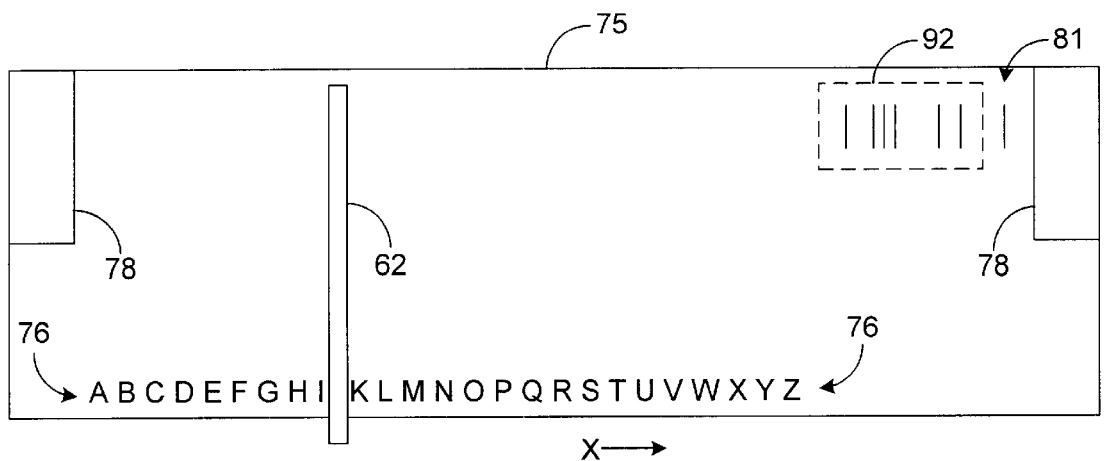
FIG. 4A is a diagram illustrating a top view of a member and a movable device that are coupled to the optical scanning device of FIG. 1A when a character is to be entered into the aforementioned optical scanning device.
Figure 4B:
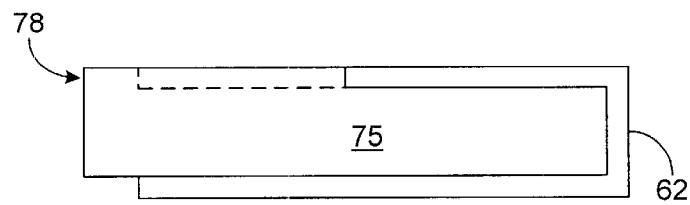
FIG. 4B is a diagram illustrating a side view of the member and movable device depicted by FIG. 4A.
Figure 4C:
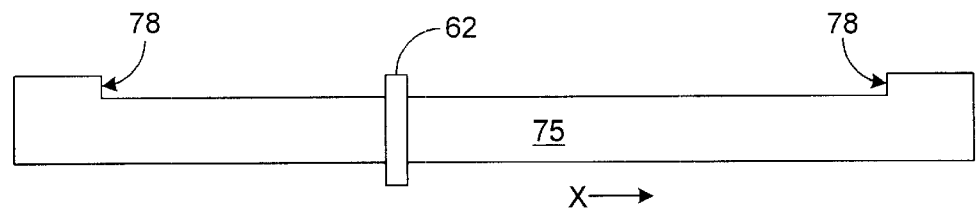
FIG. 4C is a diagram illustrating a front view of the member and movable device depicted by FIG. 4A.

When desired, data may be entered into the scanning device 15 via a movable device or indicator 62 (FIGS. 4A–4C). For example, it may be desirable to annotate a message to one of the data files 48 with data input to the scanning device 15 via movable device 62. Alternatively, it may desirable for the scanning device 15 to transmit a data file(s) 48 in an e-mail and/or facsimile message. Therefore, an e-mail address and/or telephone number may be input to the scanning device 15 via movable device 62. Other types of information may be input to the scanning device 15 in other situations.

To input a character into the scanning device 15, the movable device 62 is moved to a particular position corresponding with the character to be inputted, as will be described in further detail hereinbelow. Then, the scanning device 15 captures an image via imaging sensor 25 (FIG. 1B) through techniques known in the art. In this regard, light received by sensor 25 is converted into digital data and stored into memory 29 (FIG. 3) by data manager 45 as a data file 48. Next, the image analyzer 49 analyzes the data file 48, as will be described in more detail hereinbelow, to determine the character corresponding with the position of the movable device 62. Once this character is determined, the character is stored in memory 29 and can be further processed or manipulated as desired.

Figure 5A:
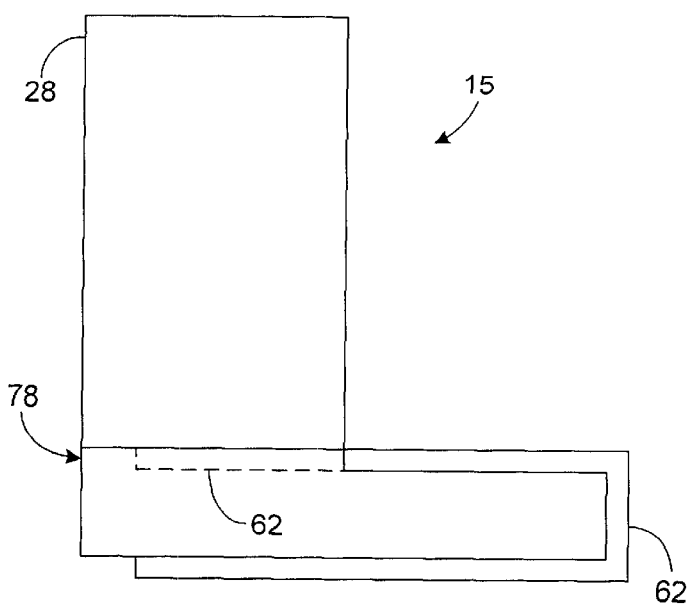
FIG. 5A is a diagram illustrating a side view of the member and movable device of FIG. 4A, when the member and movable device are coupled to the optical scanning device of FIG. 1A.
Figure 5B:
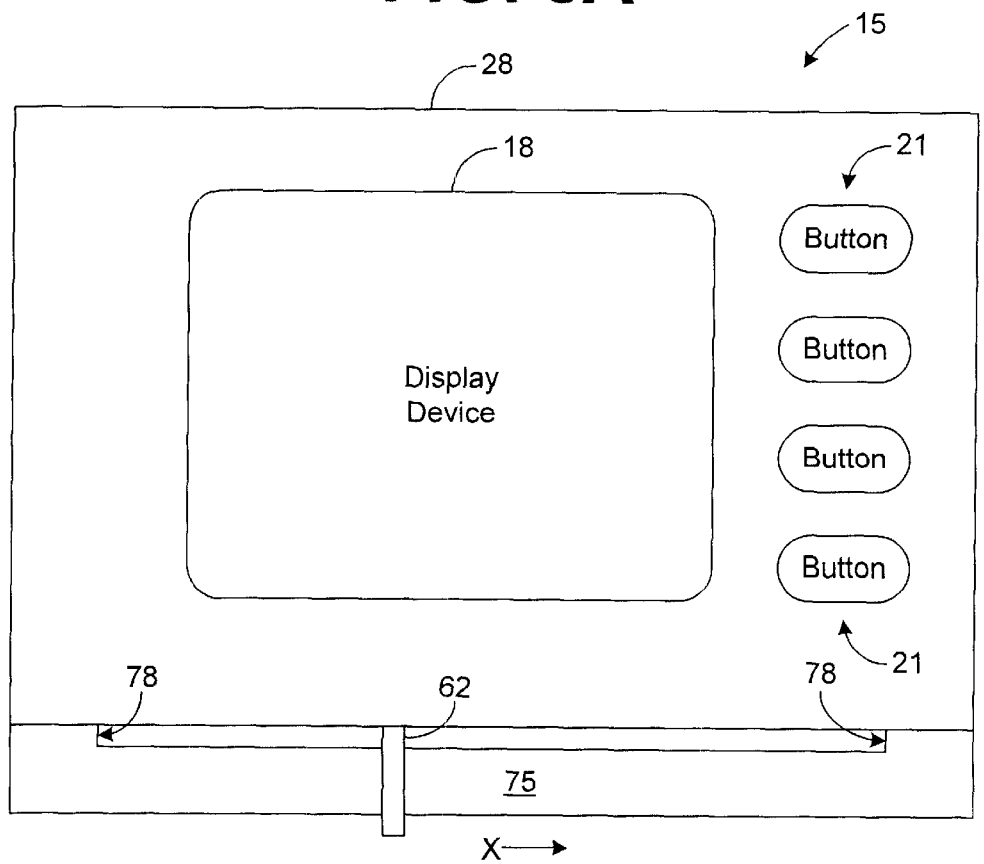
FIG. 5B is a diagram illustrating a front view of the devices depicted by FIG. 5A.

In the preferred embodiment, the movable device 62 is coupled to an elongated member 75 that includes reference characters 76 displayed along the length of the member 75, as shown by FIG. 4A. The member 75 also includes posts 78 that engage the scanning device 15 when a character is to be entered into the scanning device 15, as shown by FIGS. 5A and 5B. The member 75 is preferably secured to the scanning device 15 via any suitable technique. For example, the posts 78 or other portions of member 75 may be comprised of magnetic material such that a magnetic flux of sufficient strength to secure the member 75 to the scanning device 15 is generated. Other techniques may be employed to secure the member 75 to the scanning device 15.

The device 62 is movable in the x-direction in that it can slide back and forth across member 75 in the x-direction. Furthermore, at least a portion of the movable device 62 is exposed to the imaging sensor 25 when the member 75 is secured to the scanning device 15. In FIGS. 5A and 5B, the movable device 62 is shown to be in contact with the scanning device 15. However, in other embodiments, it is possible for the movable device 62 to be separated from the scanning device 15, when the member 75 is engaged with the scanning device 15.

To enter a character into the scanning device 15, a user slides the device 62 in the x-direction until the position of the device 62 corresponds with the character to be entered. For example, in the preferred embodiment, the position of the movable device 62 corresponds with the character 76 displayed on the member 75 at approximately the same position in the x-direction. Therefore, in FIG. 4A, the position of the movable device 62 corresponds with the character 76 covered by the movable device 62. In this regard, the position of the movable device 62 in FIG. 4A corresponds with the character "J," which resides between the characters "I" and "K" on member 75.

Once the movable device 62 is properly positioned, the user activates a button 21 or other switch to indicate that the user wishes to enter a character. In response, the imaging sensor 25 captures an image of the member 75 and movable device 62 adjacent to the imaging sensor 25, and the data manager 45 stores digital data defining this image into memory 29 as data file 48.

Next, the image analyzer 49 analyzes the data in the data file 48 defining the captured image to determine which character is being entered into the device 15. In this regard, the position of the movable device 62 indicates or corresponds to the character that is to be entered. Therefore, the image analyzer 49 determines the position of the device 62 within the captured image and, based on the position of the device 62, determines which character is to be entered.

In the preferred embodiment, the member 75 includes a reference mark 81 displayed on a portion of member 75 that is included in the captured image. The mark 81 serves as a reference from which the position of the movable device 62 can be based, and other types of references may be used in place of mark 81. The image analyzer 49 is configured to analyze the data file 48 defining the captured image of the movable device 62 and the member 75 to determine a value corresponding to the distance (in the x-direction) between the device 62 and the mark 81. Then, the image analyzer 49 determines which character corresponds to the position of the device 62 based on this distance value.

For example, the image analyzer 49 may include a table or some other data structure indicating the range of distance values corresponding with each character. For example, the character "A" displayed on member 75 may be between approximately 2 inches and 2¼ inches from the mark 81 in the x-direction. In this situation, the table should indicate that distance values corresponding with distances between approximately 2 inches and 2¼ inches are associated with the character "A." Other characters may be similarly associated with other distance values. Therefore, after determining the distance value corresponding with the distance of movable device 62 from mark 81, the image analyzer 49 may cross reference the distance value in the table to determine the character associated with the distance value. This character corresponds with the current position of the movable device 62 and is, therefore, the character entered by the user.

It should be noted that a one to one (1:1) scale does not necessarily exist between distances on the member 75 and the distance values determined by the image analyzer 49. As known in the art, the captured image may be scaled to control the size of the captured image, and any scaling of the image should be taken into account in determining which distance values correspond with the position of the device 62.

In embodiments where the member 75 can be repeatedly attached to the device 15 such that the position of the member 75 relative to sensor 25 is constant (to a high degree of precision), the mark 81 is not needed. In such an embodiment, distance values determined by the image analyzer 49 may correspond to the distance of the movable device 62 from an edge of the captured image, if desired. In other words, the edge of the image serves as the reference from which the position of the device 62 can be based.

Figure 6:
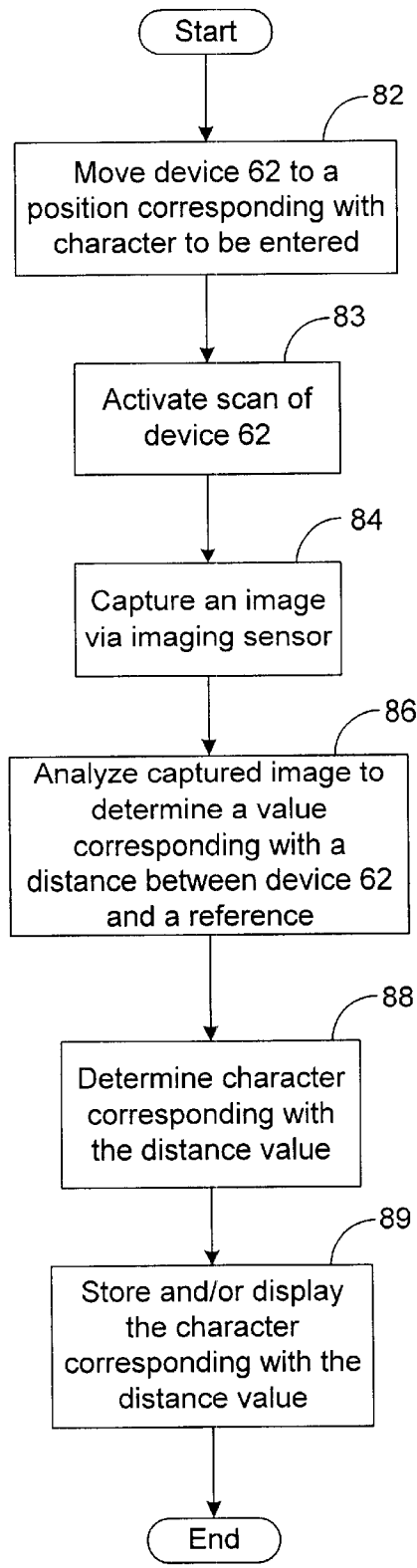
FIG. 6 is a flow chart illustrating a process of inputting a character into the optical scanning device of FIG. 1A.
Figure 7A:
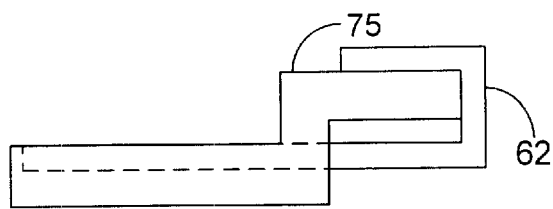
FIG. 7A is a diagram illustrating a side view of another embodiment for the member and movable device depicted by FIG. 4B.
Figure 7B:
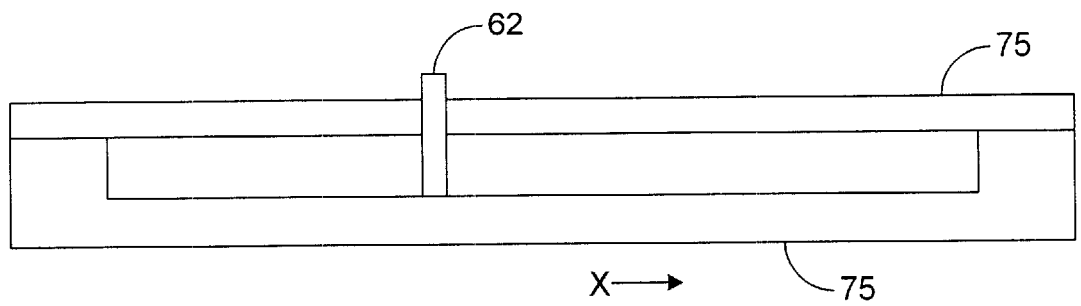
FIG. 7B is a diagram illustrating a front view of the embodiment depicted by FIG. 7A.
Figure 7C:
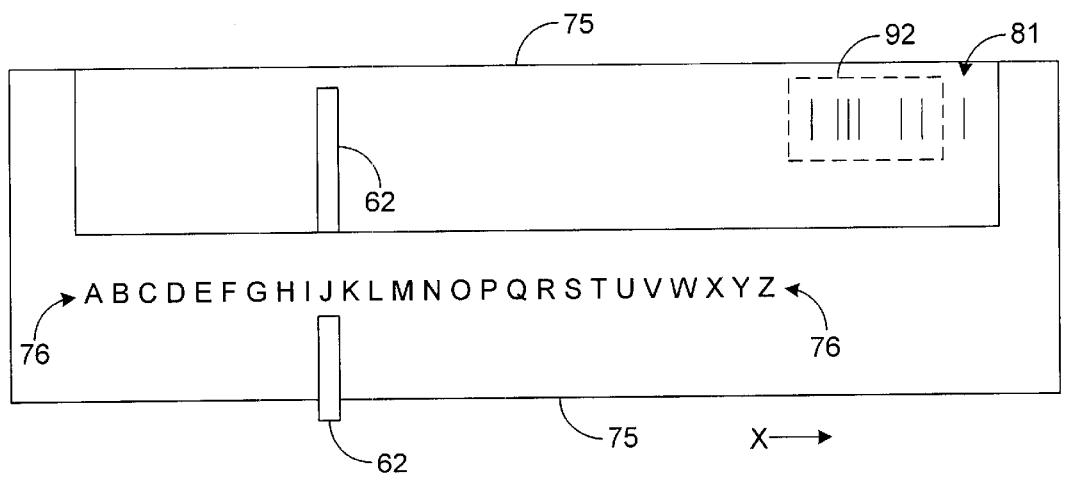
FIG. 7C is a diagram illustrating a top view of the embodiment depicted by FIG. 7A.
Figure 8:
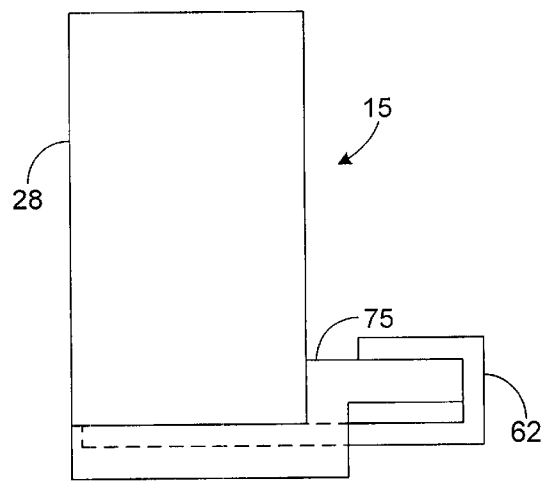
FIG. 8 is a diagram illustrating a side view of the member and movable device of FIG. 7A, when the member and movable device are coupled to the scanning device of FIG. 1A.

In operation, a user first attaches the member 75 to the scanning mechanism 15 and moves the device 62 such that the position of the device 62 corresponds with the character to be entered, as described hereinabove and indicated by block 82 of FIG. 6. For example, in the preferred embodiment, the user moves the movable device 62 until the device 62 covers the reference character 76 corresponding with the character to be entered. Then, the user activates a button 21 or other type of switch to indicate that a character should be entered into the device 15, as shown by block 83 of FIG. 6. In response, an image of the movable device 62 is captured by the sensor 25, as shown by block 84, and data defining this captured image is stored into memory 29 as a data file 48. As depicted by block 86, the image analyzer 49 then analyzes the data file 48 to determine the position of the device 62 so that a correspondence between this position and a character can be determined.

In this regard, the image analyzer 49 analyzes the data in the foregoing data file 48 to determine a value corresponding to the distance between the device 62 and the reference mark 81 of the captured image. Each character preferably corresponds to a unique distance or range of distances from the mark 81, and each distance value determined by the image analyzer 49 should, therefore, correspond to a single character. The image analyzer 49 then determines which character corresponds with the aforementioned distance value, as shown by block 88 of FIG. 6, and stores this character in memory 29 as the character entered by the user, as depicted by block 89 of FIG. 6. If desired, the character may be displayed to the user via display device 18. The aforementioned process may be repeated as desired to create a word or words.

Although not necessary for implementing the present invention, the portion of member 75 imaged by the sensor 25, when the member 75 is attached to the scanning device 15, may include coded marks 92, as shown by FIG. 4A. The coded marks 92 preferably indicate which set of characters are displayed by the member 75. For example, the member 75 of the preferred embodiment may include alphanumeric characters displayed in English, as shown by FIG. 4A. Therefore, the image analyzer 49 analyzes the data file 48 defining the imaged surface of member 75 and, based on the pattern of the marks 92, determines which set of characters should be used in block 88 (FIG. 6). In the preferred embodiment, the set of characters should correspond to an English set of characters. In other words, the image analyzer 49 selects a character in block 88 from a set of English characters.

However, in another embodiment, a member 75 displaying different characters (e.g., Chinese characters) may be coupled to the scanning device 15. In this example, the pattern of the marks 92 should indicate that the member 75 includes Chinese characters. Therefore, the image analyzer 49 analyzes the aforementioned data file 48 and determines, based on the pattern of the marks 92, that another set (i.e., a Chinese set) of characters should be used in block 88 (FIG. 6). In other words, the image analyzer 49 selects a character in block 88 from a set of Chinese characters.

It may be possible to implement the present invention without attaching member 75 to scanning device 15. For example, it may be possible to affix the movable device 62 directly to the scanning device 15, and the reference characters 76 may be displayed directly on the scanning device 15. Therefore, the position of the reference characters 76 is constant relative to the position of the imaging sensor 25, and a reference mark 81 is not needed for calibration. In such an embodiment, the distance value determined by the data manager 45 may be referenced from an edge of the captured image in determining which character corresponds to the position of the movable device 62.

It should be noted that other configurations of the member 75 may be employed without departing from the principles of the present invention. For example, FIGS. 7A–7C and FIG. 8 depict a configuration in which the portion of member 75 imaged by the imaging sensor 25 is lower than the portion of member 75 having the characters 76 displayed thereon. Therefore, the character 76 corresponding with the position of the device 62 may be visible as, shown by FIG. 7A.

Furthermore, the present invention has been described herein as implemented by a portable, hand-held optical scanner. Although the present invention is particularly useful for small optical scanners, it should be noted that other types of optical scanners may be used to implement the present invention.

It should be further emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the claims hereafter.

Now, therefore, the following is claimed:

1. An optical scanning system for receiving inputs from a user, comprising:
   a data storage device;
   an imaging sensor configured to receive light and to define digital data based on said light;
   a data manager configured to store said digital data into said data storage device;
   a housing unit coupled to said imaging sensor;
   a member detachably coupled to said housing unit, said member having a surface exposed to said imaging sensor;
   a movable device disposed between said imaging sensor and said surface; and
   an image analyzer configured to receive a set of digital data produced by said imaging sensor, said set of digital data defining an image of said movable device, said image analyzer further configured to analyze said set of digital data and to identify a character based on a position of said movable device.

2. The system of claim 1, wherein said movable device is coupled to said member and is movable across said surface.

3. The system of claim 1, wherein said surface includes at least one mark and wherein said image analyzer is configured to analyze an image of said at least one mark and to identify a group of characters based on said at least one mark, said image analyzer further configured to select said character from said group of characters.

4. The system of claim 1, wherein said image analyzer is further configured to determine a value corresponding to a distance between said movable device and a reference and to identify said character based on said value.

5. The system of claim 4, wherein said reference is a mark on said surface of said member.

6. An optical scanning system for receiving inputs from a user, comprising:
   a data storage device;
   an imaging sensor configured to receive light and to define digital data based on said light;
   a data manager configured to store said digital data into said data storage device;
   a housing unit coupled to said imaging sensor;
   a movable device attached to said housing unit; and
   an image analyzer configured to receive a set of digital data produced by said imaging sensor, said set of digital data defining an image of said movable device, said image analyzer further configured to analyze said set of digital data and to identify a character based on a position of said movable device as defined by said set of digital data.

7. The system of claim 6, wherein said image analyzer, in identifying said character, is further configured to determine a value corresponding to a distance between said movable device and a reference.

8. The system of claim 6, further comprising a member coupled to said movable device and detachably coupled to said housing unit, wherein said movable device is attached to said housing unit via said member.

9. The system of claim 8, wherein said image analyzer is further configured to determine a value corresponding to a distance between a reference and said movable device and to identify said character based on said value.

10. The system of claim 8, wherein said member includes a surface having at least one mark displayed thereon and wherein said image analyzer is further configured to identify a set of characters based on said at least one mark and to select said character from said set of characters.

11. An optical scanning system for receiving inputs from a user, comprising:
   a movable device;
   means for scanning a document, said scanning means producing data defining an image of said movable device; and
   means for analyzing said data to determine a position of said movable device and to select a character based on said position.

12. The system of claim 11, further comprising:
   a housing unit for housing said producing means and said analyzing means; and
   a member coupled to said housing unit, said movable device disposed between said member and said scanning means, said member having a mark visible on a surface of said member,
      wherein said analyzing means determines a value corresponding to a distance between said mark and said movable device.

13. The system of claim 12, wherein said member has at least one mark visible on said surface of said member and wherein said analyzing means selects a set of characters based on said at least one mark and selects said character from said set of characters.

14. The system of claim 13, wherein said movable device is coupled to said member and is movable across said surface of said member.

15. An optical scanning method for receiving inputs from a user, comprising the steps of:
   providing a scanning device, said scanning device having an imaging sensor;
   receiving an image of a document via said imaging sensor;
   defining said image in data;
   positioning an indicator such that said indicator is visible to said imaging sensor;
   receiving an image of said indicator via said imaging sensor;
   defining said image of said indicator in data;
   analyzing said data of said image of said indicator;
   determining a position of said indicator based on said analyzing step; and
   identifying a character based on said determining step.

16. The method of claim 15, further comprising the steps of:
   providing a member;
   coupling said member to said scanning device such that a surface of said member is visible to said imaging sensor;
   identifying a reference on said surface; and
   determining a value corresponding to a distance between said reference and said indicator.

17. The method of claim 15, further comprising the steps of:
   providing a member;
   coupling said member to said scanning device such that a surface of said member is visible to said imaging sensor;
   identifying at least one mark on said surface;
   selecting a set of characters based on said at least one mark; and
   performing said identifying step based on said selecting step.

* * * * *